(12) United States Patent  (10) Patent No.: US 8,042,372 B2
Carsley et al.  (45) Date of Patent: *Oct. 25, 2011

(54) METHOD OF MAKING AN AUTOMOTIVE CLOSURE PANEL ASSEMBLY

(75) Inventors: John E. Carsley, Clinton Township, MI (US); Richard M. Kleber, Clarkston, MI (US); Gary R. Pelowski, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 703 days.

This patent is subject to a terminal disclaimer.

(21) Appl. No.: 12/110,657

(22) Filed: Apr. 28, 2008

(65) Prior Publication Data

US 2009/0229335 A1 Sep. 17, 2009

Related U.S. Application Data

(60) Provisional application No. 61/036,490, filed on Mar. 14, 2008.

(51) Int. Cl.
*B21D 37/16* (2006.01)
(52) U.S. Cl. .... 72/342.94; 72/342.1; 29/509; 29/243.58
(58) Field of Classification Search ................. 72/342.1, 72/342.94, 364, 379.2, 306, 307; 29/509, 29/513, 243.58
See application file for complete search history.

(56) References Cited

U.S. PATENT DOCUMENTS

| 5,359,872 | A  | * | 11/1994 | Nashiki .......................... 72/16.1 |
| 5,948,185 | A  |   | 9/1999  | Krajewski et al. |
| 6,344,626 | B1 | * | 2/2002  | Busuttil .................... 219/121.63 |
| 6,640,604 | B2 | * | 11/2003 | Matsushita ................... 72/342.1 |
| 6,642,473 | B2 | * | 11/2003 | Stiers et al. .............. 219/121.63 |
| 6,672,121 | B2 |   | 1/2004  | Carsley et al. |
| 6,711,929 | B2 | * | 3/2004  | Yamaguchi et al. ......... 72/342.1 |
| 6,927,370 | B2 |   | 8/2005  | McClure et al. |
| 7,263,757 | B2 |   | 9/2007  | Herman |
| 7,290,318 | B2 |   | 11/2007 | Bradley et al. |
| 7,290,423 | B2 |   | 11/2007 | Carsley et al. |
| 7,770,955 | B2 | * | 8/2010  | Kleber et al. .................... 296/29 |

FOREIGN PATENT DOCUMENTS

| JP | 64-40120    | * | 2/1989  |
| JP | 2-280930    | * | 11/1990 |
| JP | 6-285659    | * | 10/1994 |
| JP | 2007-185678 |   | 7/1995  |
| JP | 2004-034798 |   | 2/2004  |

* cited by examiner

*Primary Examiner* — Edward Tolan
(74) *Attorney, Agent, or Firm* — Reising Ethington P.C.

(57) ABSTRACT

A method may include providing an outer panel that may have a flange that defines at least one planar section. The flange may be heated at the at least one planar section, and the flange may be bent about the at least one planar section.

19 Claims, 2 Drawing Sheets

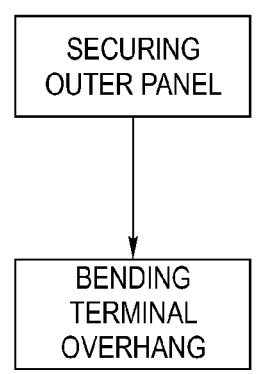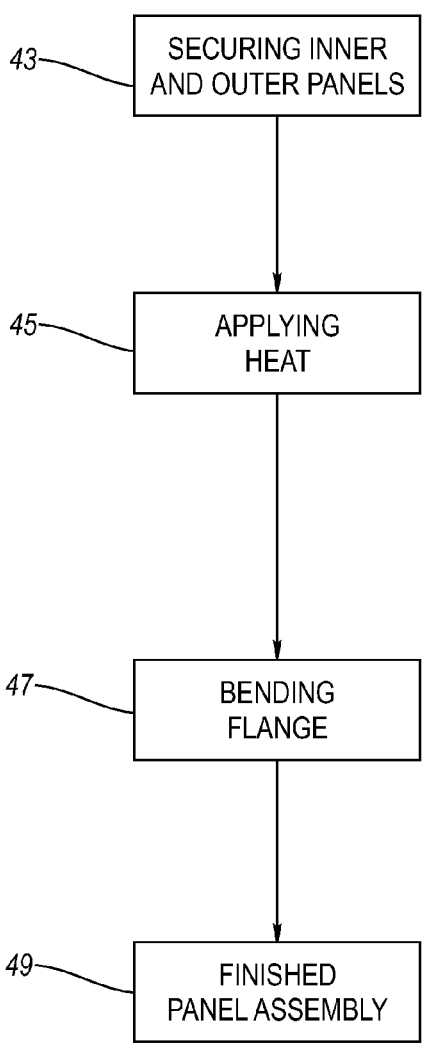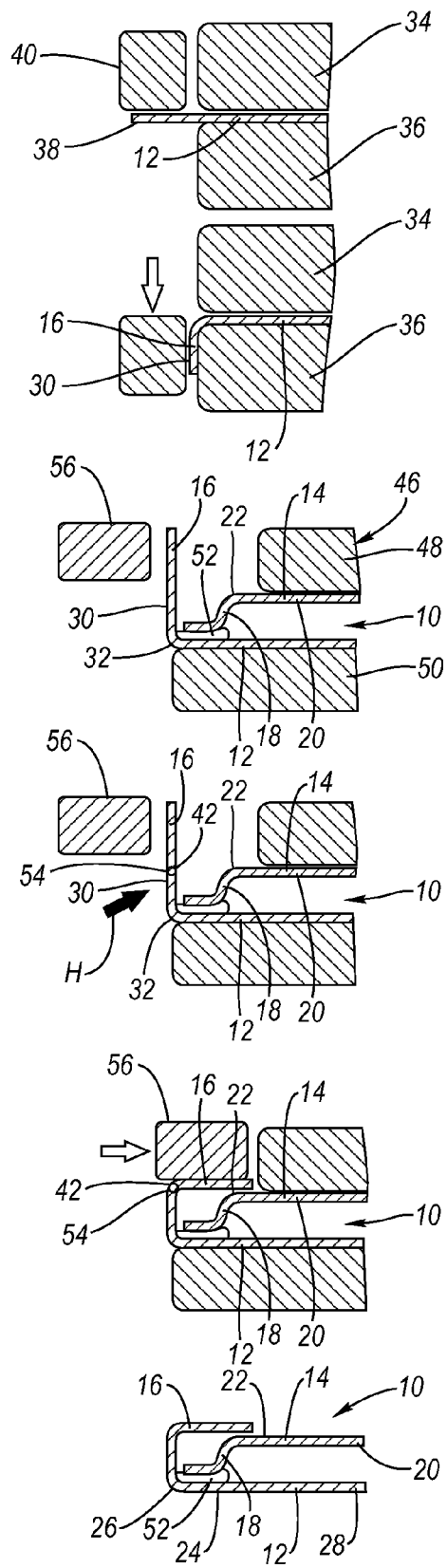

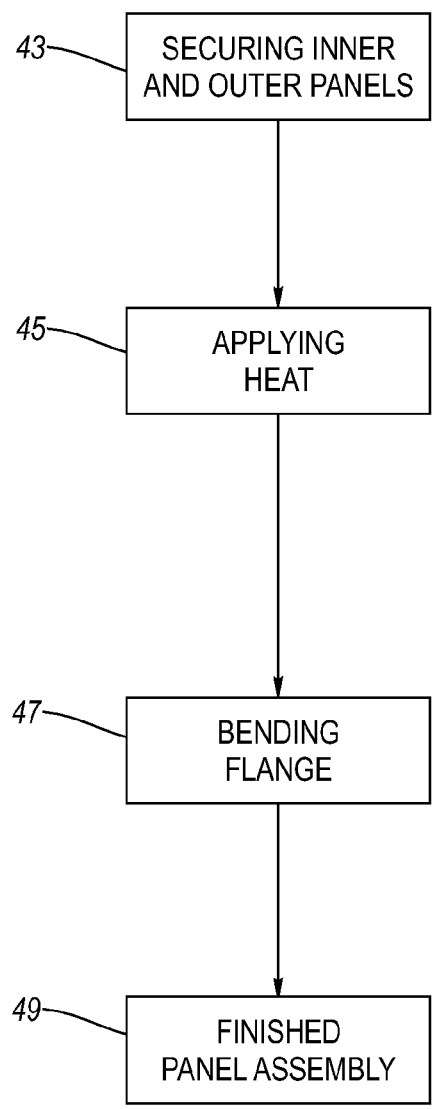
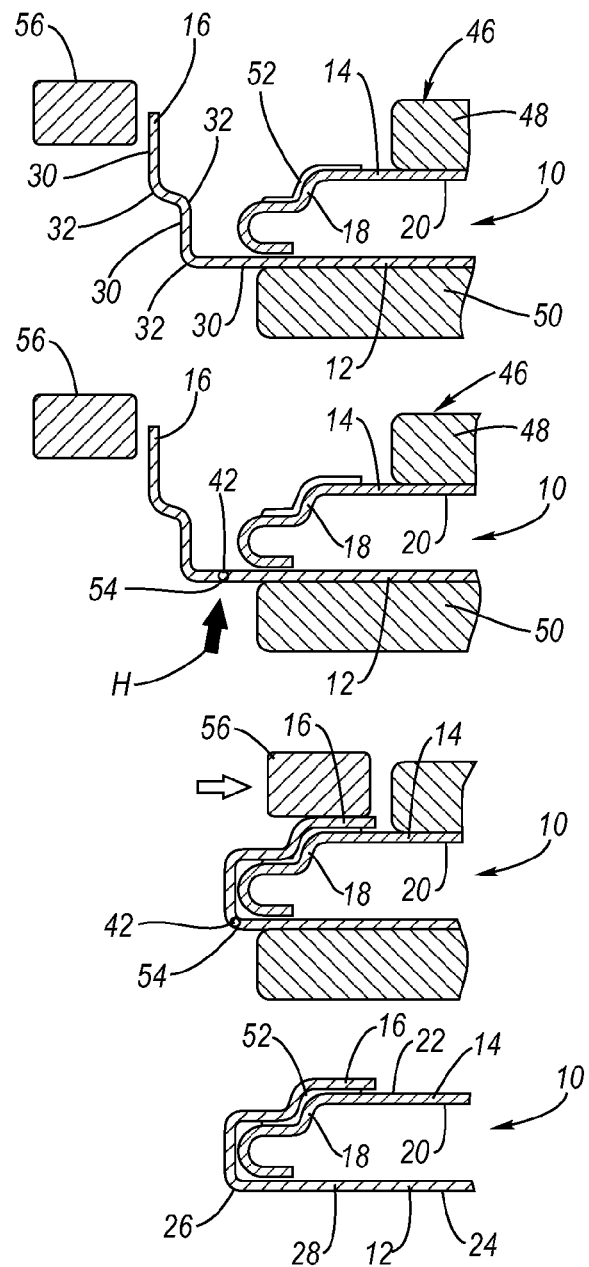
Fig. 3

METHOD OF MAKING AN AUTOMOTIVE CLOSURE PANEL ASSEMBLY

CROSS-REFERENCE TO RELATED APPLICATIONS

This application claims the benefit of U.S. Provisional Application No. 61/036,490, filed Mar. 14, 2008.

TECHNICAL FIELD

The field to which the disclosure generally relates includes methods of making an automotive closure panel assembly having a flange that is folded over an inner panel.

BACKGROUND

Automotive closure panel assemblies can sometimes have an inner panel and an outer panel that are held together after a hemming process where a flange of the outer panel is typically folded over an edge of the inner panel. Usually the flange is folded about an already existing bend, or is folded against a die that provides a hard die radius. But sometimes it is not desirable or possible to fold the flange about an existing bend, and other times it is not convenient to fold the flange against a die.

SUMMARY OF EXEMPLARY EMBODIMENTS OF THE INVENTION

One embodiment of the invention may include a method of making a product which may include providing an outer panel with a flange that has at least one planar section in it. The method may include holding an inner panel adjacent the outer panel by a workpiece holder. The method may include leaving the at least one planar section so that it is exposed out of the workpiece holder. The method may further include concentrating heat application to the at least one planar section in order to predefine, or pre-establish, a hem line across the at least one planar section. The method may also include bending the at least one planar section at the predefined hem line such that at least a part of the flange folds over the inner panel.

One embodiment of the invention may include a method of making a product which may include providing a flange of an outer panel that is a part of an automotive closure panel assembly. The flange may have at least one planar section and may have at least one bend in it. The method may also include heating the at least one planar section at a location that is away from, or otherwise remote of, the at least one bend. The method may further include bending the flange about the heated location.

One embodiment of the invention may include a method of making a product which may include providing an inner panel and an outer panel of an automotive closure panel assembly. The outer panel may be composed of magnesium or a magnesium alloy. The method may include forming a flange in a periphery of the outer panel. The flange may have at least one bend and may have at least one planar section in it. The method may include holding the inner panel over the outer panel by a workpiece holder. The flange may be exposed out of the workpiece holder. The method may also include applying heat directly to the at least one planar section and away from the at least one bend. In this way, a hem line is predefined, or pre-established, along the at least one planar section. The predefined hem line may be more susceptible to deformation (e.g., weaker in physical properties) as compared to the at least one bend. The method may further include bending the flange about the predefined hem line such that at least a part of the flange folds over the inner panel.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 1 is a schematic showing one example of a method of forming a flange in a panel.

FIG. 2 is a schematic showing some steps of one example of a method of bending a flange of a panel.

FIG. 3 is a schematic showing some steps of one example of a method of bending a flange of a panel.

DETAILED DESCRIPTION OF EXEMPLARY EMBODIMENTS

The following description of the embodiment(s) is merely exemplary in nature and is in no way intended to limit the invention, its application, or uses.

The figures illustrate embodiments of some steps of a method involved in hemming a panel assembly such as an automotive closure panel assembly 10. The subject matter shown and described may be used with different automotive closure panel assemblies including a hood, a door, a hatch, and the like. The automotive closure panel assembly 10 may include an outer panel 12 and an inner panel 14 that are held together after a hemming process where a flange 16 of the outer panel may be folded over the inner panel. When folded, the flange 16 may be bent at a location that is heated and that is not necessarily at a bend that may already exist in the flange. And in some cases, the flange 16 may be bent without the use of a die that provides a hard die radius.

The outer and inner panels 12, 14 may be initially constructed by various metal forming processes. In one example, metal sheets are cut, surfaces are treated, and 3-dimensional contours are formed by drawing or stamping. In some cases, the inner panel 14 may have a more complex configuration than the outer panel 12, and may serve to reinforce the outer panel. Referring to FIG. 2 the inner panel 14 may have a flange 18 that is continuous around its periphery and extends from a body 20, and the inner panel may have an outer surface 22.

The outer panel 12 may constitute the more readily visible panel of the automotive closure assembly panel 10 when installed in an automobile. For example, the outer panel 12 may have a "show" or outer surface 24 which may be the exterior of a vehicle hood. In different embodiments, the outer panel 12 may be composed of steel, steel alloys, aluminum, aluminum alloys, magnesium, or magnesium alloys; the outer panel may also be composed of dissimilar materials. When the outer panel 12 is composed of magnesium or magnesium alloys, the outer panel may be difficult to bend (especially at non-elevated temperatures), and the outer panel may be thicker as compared to outer panels of other materials.

Referring to FIGS. 2 and 3, an edge 26 may bound a body 28 of the outer panel 12 to define a perimeter of the outer panel. The flange 16 may protrude from the body 28, and may extend continuously from the edge 26 to form a peripheral rim in the outer panel 12. The flange 16 may be unitary with the body 28. In different embodiments, the flange 16 may be shaped with one or more planar sections 30 and one or more bends 32. The exact number of planar sections and bends may be dictated by, among other things, the shape of the flange 18 of the inner panel 14. In the example of FIG. 1, the flange 16 may be constructed by securing the outer panel 12 between an upper die 34 and a lower die 36 with a terminal overhang 38 exposed out of the dies. A tool 40 may then be actuated in a direction that forms a 90° angle (or other angle) with respect to the terminal overhang 38, to thus bend the terminal overhang about a hard die radius provided by the lower die 36. In other embodiments, other processes may be used to construct the flange 16.

After the flange 16 is formed, in one example the already existing bend 32 may constitute a hem line about which the outer panel 12 is hemmed with (i.e., folded over) the inner panel 14. In this example, the already existing bend 32 may be susceptible to deformation because its physical properties may have been weakened by being bent, and thus the outer panel 12 can be hemmed thereabout more easily than at the planar section 30.

In one example hemming process, the outer panel 12 may be folded over the inner panel 14 about a predefined hem line 42 that is formed on the planar section 30 by heat applied directly to the planar section. In the example of FIGS. 2 and 3, at a step 43 a workpiece holder 46 may secure the inner panel 14 over the outer panel 12 with a slight gap separating the panels. A clamp 48 may clasp the outer and the inner panel 12, 14 to an anvil 50, while the flange 16 may remain exposed out of the workpiece holder 46. An adhesive 52 may be applied at an area of contact or eventual contact between the outer panel 12 and the inner panel 14 to provide an additional joint between the panels. Other than or in addition to adhesive, the outer and inner panels 12, 14 may be joined by welding, soldering, gluing, bolting, riveting, or the like.

In a step 45, heat may be applied directly to the planar section 30 to predefine, or otherwise pre-establish, the hem line 42 continuously across the flange 16 (the heat being represented by an arrow H). The applied heat may induce a breakline, or bendline, at the hem line 42 about which the flange 16 is folded during the hemming process. The mechanical and physical microstructural properties of the material at a heat region 54 where the heat is applied may temporarily weaken (e.g., soften), making the hem line 42 more susceptible or prone to bending than at the bend 32. In other words, the heating may improve bendability at the hem line 42. The exact change in physical property may depend on, among other things, the material of the flange 16 and the temperature at which the heat region 54 is elevated. For example, a flange composed of magnesium or a magnesium alloy may be heated to about 270° C. or other temperatures in order to induce such a breakline. In the examples of FIGS. 2 and 3, the heat region 54 may be located about the middle of the planar section 30 where it is away from the adhesive 52 and, thus, depending on the case, may not adversely affect the adhesive 52.

The heat may be applied by a method that locally and rapidly concentrates heat to the heat region 54, while substantially isolating the associated elevated temperature to the heat region. For example, a laser such as an Nd:YAG laser, a carbon dioxide laser, a laser diode, and the like, may be used to aim and focus heat at the heat region 54. In another example, an induction coil may be used to target induction heat to the heat region 54.

In a step 47, the flange 16 may be bent at the hem line 42 while the heat region 54 is at an elevated temperature to thus fold a part of the flange over the inner panel 14. In the example of FIG. 2, a tool 56 may be actuated in a direction that may be at a 90° angle (or other angle) with respect to the flange 16 to thus bend the flange at that angle. With heating, the flange 16 may bend at the hem line 42 instead of at the bend 32.

In other embodiments, other processes may be used to bend the flange 16. For example, a roller hemming process may use a robotic roller apparatus. The robotic roller apparatus may have two or more sequential rollers that perform progressive hemming where a first roller may prehem the flange 16 about the hem line 42, and where a second roller then may fold the flange partly over the inner panel 14. In some embodiments, the heating and bending steps may be integrated. In one example, a laser apparatus may be equipped to the robotic roller apparatus so that the laser apparatus can heat the heat region 54 before the flange 16 is bent. In another example, an induction coil apparatus may be equipped to the robotic roller apparatus so that the induction coil apparatus can heat the heat region 54 before the flange 16 is bent. In another example, friction heating may be used to heat the heat region 54 before the flange 16 is bent. Here, a friction roller may be equipped to the robotic roller apparatus and may be rotated by an electric motor. The friction roller may contact the heat region 54 before the first roller prehems the flange 16. In other examples, the laser apparatus, the induction coil apparatus, or the friction roller may be equipped to a hemming press or a hemming die in order to heat the heat region 54 before the flange 16 is hemmed. In other embodiments, the laser apparatus, the induction coil apparatus, or the friction roller may be equipped to a table top hemming machine in order to perform a table top hemming process.

In a step 49, the finished automotive closure panel assembly 10 may be completely formed without the use of a hard die radius and without adversely affecting the adhesive 52; and in some cases, the heat may help cure the adhesive.

The example of FIG. 3 shows the flanges 16 and 18 having a more complex shape than shown in FIG. 2. The flange 18 of the inner panel 14 has several bends, and the flange 16 of the outer panel has several bends 32 and several planar sections 30. In this example, one planar section 30 is exposed out of the workpiece holder 46 and is heated and bent at that planar section.

Though shown and described as having given steps in a given order, neither the exact steps nor the exact order need be performed. For example, in some cases more steps may be performed, and in other cases steps may be combined. For instance, the flange 16 may be constructed by a similar process as that shown and described in FIG. 2 rather than the process shown and described in FIG. 1.

The above description of embodiments of the invention is merely exemplary in nature and, thus, variations thereof are not to be regarded as a departure from the spirit and scope of the invention.

What is claimed is:

1. A method of hemming at least a portion of a panel assembly, the method comprising:
   providing an outer panel having a flange defining at least one planar section and having at least one first bend, and providing an inner panel having at least one second bend;
   holding the inner panel adjacent the outer panel by a workpiece holder;
   leaving the at least one planar section exposed out of the workpiece holder;
   concentrating heat application to the at least one planar section to predefine a hem line across the at least one planar section; and bending the at least one planar section at the predefined hem line, whereby the flange folds over the inner panel, wherein the predefined hem line and the at least one first bend are spaced away from each other via a portion of the at least one planar section, and wherein, after bending at the predefined hem line and folding the flange over the inner panel, the flange of the outer panel is folded over the at least one second bend of the inner panel.

2. A method as set forth in claim 1 further comprising concentrating heat application away from the at least one first bend whereby the predefined hem line is more susceptible to bending than the at least one first bend.

3. A method as set forth in claim 1 further comprising concentrating heat application away from the at least one first bend whereby the temperature at the at least one planar section is higher than the temperature at the at least one first bend.

4. A method as set forth in claim 1 wherein bending the at least one planar section is performed without the use of a hard die radius.

5. A method as set forth in claim 1 further comprising applying adhesive to adhere the inner panel and the outer panel together, and comprising concentrating heat application away from where the adhesive is applied.

6. A method as set forth in claim 1 wherein concentrating heat application comprises aiming a laser at the at least one planar section to heat the at least one planar section to predefine a hem line across the at least one planar section.

7. A method as set forth in claim 1 wherein concentrating heat application comprises using an induction coil to heat the at least one planar section to predefine a hem line across the at least one planar section.

8. A method as set forth in claim 1 wherein the outer panel is composed of magnesium or a magnesium alloy.

9. A method of hemming at least a portion of an automotive closure panel assembly, the method comprising:
   providing a flange of an outer panel of an automotive closure panel assembly, the flange having at least one planar section;
   providing the flange by forming at least one bend in the outer panel against a die that serves as a hard die radius;
   heating the at least one planar section at a location away from the at least one bend; and
   bending the flange about the heated location to form a second bend that is spaced away from the at least one bend by a portion of the at least one planar section, the second bend being formed without the use of a hard die radius.

10. A method as set forth in claim 9 wherein heating comprises applying heat directly to the at least one planar section and not directly to the at least one bend.

11. A method as set forth in claim 10 wherein applying heat comprises using a laser to apply heat directly to the at least one planar section.

12. A method as set forth in claim 10 wherein applying heat comprises using an induction coil to apply heat directly to the at least one planar section.

13. A method as set forth in claim 9 wherein bending comprises bending the flange about the heated location and not about the at least one bend.

14. A method as set forth in claim 9 wherein providing comprises providing the flange being composed of magnesium or a magnesium alloy.

15. A method as set forth in claim 9 further comprising providing an inner panel of the automotive closure panel assembly.

16. A method of hemming at least a portion of an automotive closure panel assembly, the method comprising:
   providing an inner panel and an outer panel of an automotive closure panel assembly, the outer panel being composed of magnesium or a magnesium alloy;
   forming a flange in a periphery of the outer panel, the flange having at least one bend and at least one planar section;
   holding the inner panel over the outer panel by a workpiece holder, with the flange being exposed out of the workpiece holder;
   applying heat directly to the at least one planar section and away from the at least one bend to predefine a hem line along the at least one planar section, the predefined hem line being more susceptible to deformation than the at least one bend; and
   bending the flange about the predefined hem line whereby the flange folds over the inner panel.

17. A method as set forth in claim 16 wherein applying heat comprises using a laser.

18. A method as set forth in claim 16 wherein applying heat comprises using an induction coil.

19. A method as set forth in claim 16 wherein bending the flange comprises bending the flange about the predefined hem line and not about the at least one bend.

* * * * *